(12) United States Patent
Choi et al.

(10) Patent No.: US 8,359,620 B2
(45) Date of Patent: Jan. 22, 2013

(54) SET-TOP BOX FOR WIDEBAND IP TELEPHONY SERVICE AND METHOD FOR PROVIDING WIDEBAND IP TELEPHONY SERVICE USING SET-TOP BOX

(75) Inventors: Seung-Han Choi, Gyeonggi-do (KR);
Woon-Seob So, Daejeon-si (KR);
Do-Young Kim, Daejeon-si (KR);
Hyun-Joo Bae, Daejeon-si (KR);
Byung-Sun Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 246 days.

(21) Appl. No.: 12/850,139

(22) Filed: Aug. 4, 2010

(65) Prior Publication Data

US 2011/0145872 A1    Jun. 16, 2011

(30) Foreign Application Priority Data

Dec. 15, 2009    (KR) .......................... 10-2009-0124774

(51) Int. Cl.
*H04N 7/173*    (2011.01)
(52) U.S. Cl. ........................................ 725/106; 709/224
(58) Field of Classification Search ................. 725/106; 709/224
See application file for complete search history.

(56) References Cited

U.S. PATENT DOCUMENTS

| | | | |
|---|---|---|---|
| 2009/0100176 A1* | 4/2009 | Hicks et al. | 709/224 |
| 2009/0247152 A1* | 10/2009 | Manne | 455/426.2 |
| 2010/0254370 A1* | 10/2010 | Jana et al. | 370/352 |
| 2010/0266000 A1* | 10/2010 | Froimovich et al. | 375/222 |
| 2011/0107364 A1* | 5/2011 | Lajoie et al. | 725/25 |

FOREIGN PATENT DOCUMENTS

KR    10-0534598    12/2005

\* cited by examiner

*Primary Examiner* — Hunter B Lonsberry
(74) *Attorney, Agent, or Firm* — Nelson Mullins Riley & Scarborough LLP; EuiHoon Lee, Esq.

(57) ABSTRACT

An Internet Set-Top Box (ISTB) and a method of providing wideband IP telephony services using the ISTB are provided, which are capable of implementing wideband voice communication services using a wideband voice codec, controlling a Real-Time Transport Protocol (RTP) packet payload to process a variety of wideband speech frame payloads, and providing high-quality wideband IP telephony services by controlling a jitter buffer to maintain conference call synchronization.

11 Claims, 7 Drawing Sheets

SET-TOP BOX FOR WIDEBAND IP TELEPHONY SERVICE AND METHOD FOR PROVIDING WIDEBAND IP TELEPHONY SERVICE USING SET-TOP BOX

CROSS-REFERENCE TO RELATED APPLICATION

This application claims the benefit under 35 U.S.C. §119(a) of Korean Patent Application No. 10-2009-0124774, filed on Dec. 15, 2009, the entire disclosure of which is incorporated herein by reference for all purposes.

BACKGROUND

1. Field

The following description relates to a system for wideband IP telephony services through an Internet Set-Top Box (ISTB) and, more particularly, to a system for implementing wideband voice communication services using a wideband voice codec through an ISTB, for controlling Real-Time Transport Protocol (RTP) packet payload to process a variety of wideband speech frame payloads, and for controlling a jitter buffer to maintain conference call synchronization.

2. Description of the Related Art

An Internet Set-Top Box (ISTB) has been developed to provide a variety of add-on services as well as broadcast services for digital televisions. An example of the add-on service is IP telephony, which is based on a narrowband codec, such as G.711 or G.729 audio codec. The narrowband codec, such as G.711 or G.729 audio codec, samples across a frequency range from about 300 Hz to 3.4 kHz and provides audio quality comparable to a typical analog telephone.

In order to provide better quality and more flexibility than the narrowband codec, a wideband codec, such as G.711.1 or G.729.1, which samples across a frequency range from about 50 Hz to 7 kHz has been designed.

In the case of the wideband codec, a transmission bit rate of a voice codec frame may be changed depending on network conditions during a telephone call. However, there has not been provided a technology for processing a variety of speech frame payloads which are included in Real-Time Transport Protocol (RTP) packet payloads.

Further, in the case of a conference call service through the ISTB, there has not been provided a technology for maintaining call synchronization for users participating in the conference call service to use conference services according to a local network for their IP phones and the ISTB.

SUMMARY

The following description relates to an Internet Set-Top Box (ISTB) and a method of providing wideband IP telephony services using the ISTB, capable of implementing wideband voice communication services using a wideband voice codec, controlling a Real-Time Transport Protocol (RTP) packet payload to process a variety of wideband speech frame payloads, and providing high-quality wideband IP telephony services by controlling a jitter buffer to maintain conference call synchronization.

In one general aspect, there is provided a set-top box providing wideband IP telephony services over Internet, including: an interface transmitting or receiving a broadcast signal or an IP phone signal; an intermediary unit separately outputting the broadcast signal and the IP phone signal; and a wideband voice processor converting the IP phone signal received from the intermediary unit into a voice signal using a wideband voice codec and converting an input voice signal into an IP phone signal using the wideband voice codec.

The wideband voice processor may include: a packet transceiver discriminately outputting a voice codec frame included in the IP phone signal received from the intermediary unit as a narrowband codec frame or a wideband codec frame, and generating a different IP phone signal according to whether the voice codec frame is a narrowband codec frame or a wideband codec frame; a jitter buffer processor controlling a size of a jitter buffer and storing the voice codec frame received from the packet transceiver therein or deleting a stored voice codec frame therefrom; a codec decoding the voice codec frame stored in the jitter buffer into a voice signal or encoding the voice signal into a voice codec frame; and a session initiation protocol (SIP) call processor setting up and tearing down voice calls through the SIP.

The packet transceiver may include: a real-time transport protocol (RTP) packet receiver extracting an RTP packet from an IP phone signal received in a user datagram protocol (UDP) packet format; an RTP packet analyzer analyzing a header of the RTP packet to check type of an RTP packet payload included in the RTP packet; and an RTP packet payload analyzer extracting a voice codec frame according to the RTP packet payload type and, if a header of the RTP packet payload is present, outputting the voice codec frame as a wideband codec frame.

The packet transceiver may include: an RTP packet payload generator generating an RTP packet payload including the voice codec frame, which is encoded by the codec, with a payload header added thereto if the voice codec frame is a wideband codec frame; an RTP packet generator generating an RTP packet with a packet header added thereto, the packet header indicating type of the RTP packet payload using codec information of the voice codec frame; and an RTP packet transmitter converting the RTP packet into an IP phone signal of a UDP packet format and transmitting the converted RTP packet.

The jitter buffer processor may include: a jitter buffer input receiving the voice codec frame and type and characteristic information of a voice codec for the voice codec frame from the packet transceiver; a jitter buffer operator controlling a size of the jitter buffer using the type and characteristic information of the voice codec by storing the voice codec frame in the jitter buffer or deleting a stored voice codec frame from the jitter buffer; and a jitter buffer output outputting the voice codec frame stored in the jitter buffer at regular intervals.

The jitter buffer processor may include: a message receiver receiving a message including information about a size of a jitter buffer of another set-top box which is connected to the set-top box to participate in an Internet call; a message sender sending a message including information about a size of a jitter buffer of the set-top box to the other set-top box; and a jitter buffer size calculator calculating the size of the jitter buffer using traffic delay information of the Internet, number of voice codec frames stored in and deleted from the jitter buffer, and information about the jitter buffer size of the other set-top box included in the received message.

The set-top box may further include: a media negotiator setting IP address, UDP address and codec information of the set-top box; an intermediary manager managing resource information set by the media negotiator, and RTP packet intermediary information, codec information and jitter buffer information of another set-top box which is connected to the set-top box to participate in an Internet call; and a voice signal mixer mixing voice signals decoded by the codec.

In another general aspect, there is provided a method of providing wideband IP telephony services through a set-top box providing broadcast services over Internet, the method including: performing call setup or tear-down through Session Initiation Protocol (SIP); receiving a broadcast signal or an IP phone signal; outputting the broadcast signal and the Internet signal separately; storing a voice codec frame included in the IP phone signal in a jitter buffer, controlling a size of the jitter buffer, and storing the voice codec frame or deleting a stored voice codec frame; discriminately outputting the voice codec frame included in the IP phone signal as a narrowband codec frame or a wideband codec frame; and decoding the voice codec frame stored in the jitter buffer into a voice signal.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
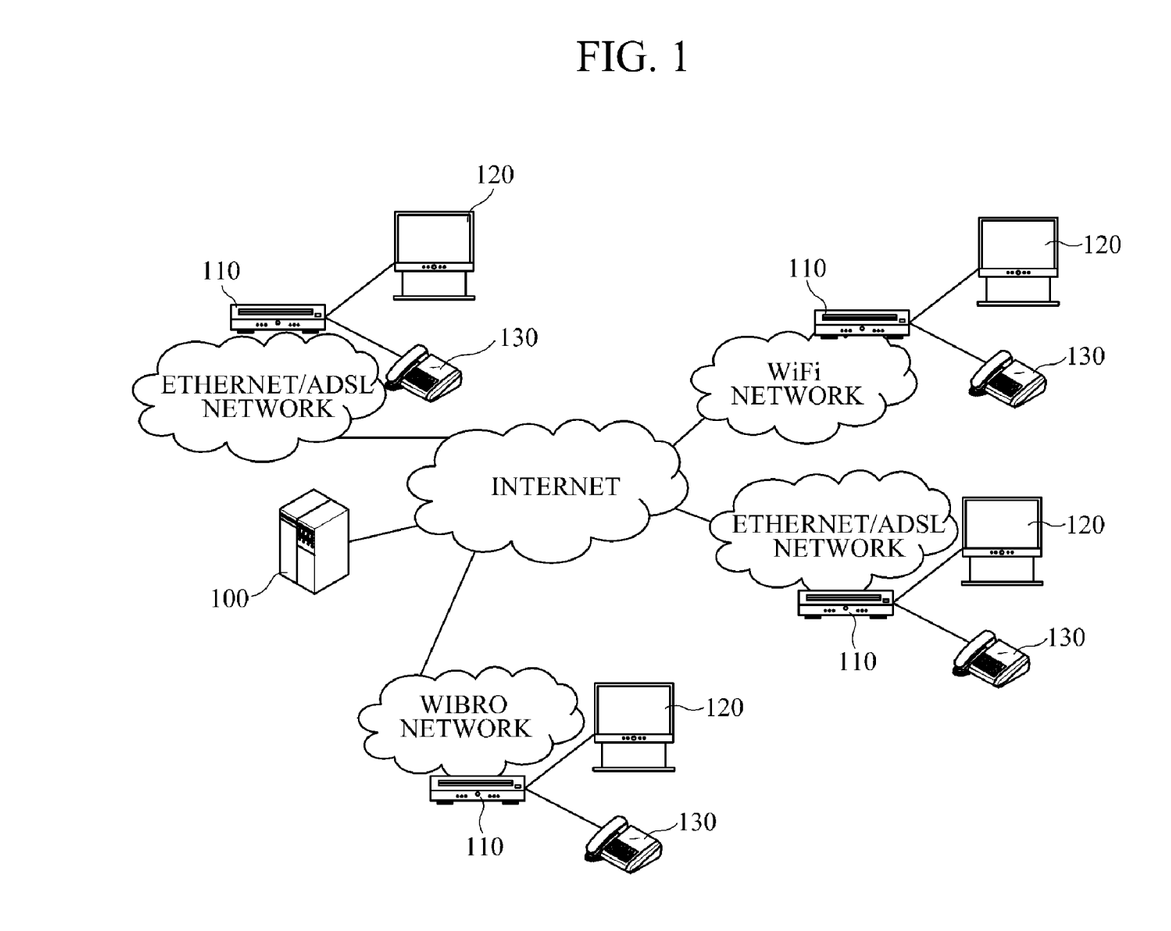
FIG. 1 is a diagram illustrating an example of a system for providing broadcast and IP telephony services through an Internet Set-Top Box (ISTB) according to an exemplary embodiment of the present invention.

FIG. 1 is a diagram illustrating an example of a system for providing broadcast and IP telephony services through an Internet Set-Top Box (ISTB) according to an exemplary embodiment of the present invention.

Referring to FIG. 1, an Internet digital television 120 and a wideband IP phone 130 are provided with broadcast and wideband IP telephony services through an ISTB 110 which is connected to a variety of networks, such as an Ethernet/ADSL network, a WiFi network, and a WiBro network.

An Internet broadcast/IP telephony server 100 transmits broadcast streams to the ISTB 110 and performs authentication, accounting and relay for IP telephony services.

Figure 2:
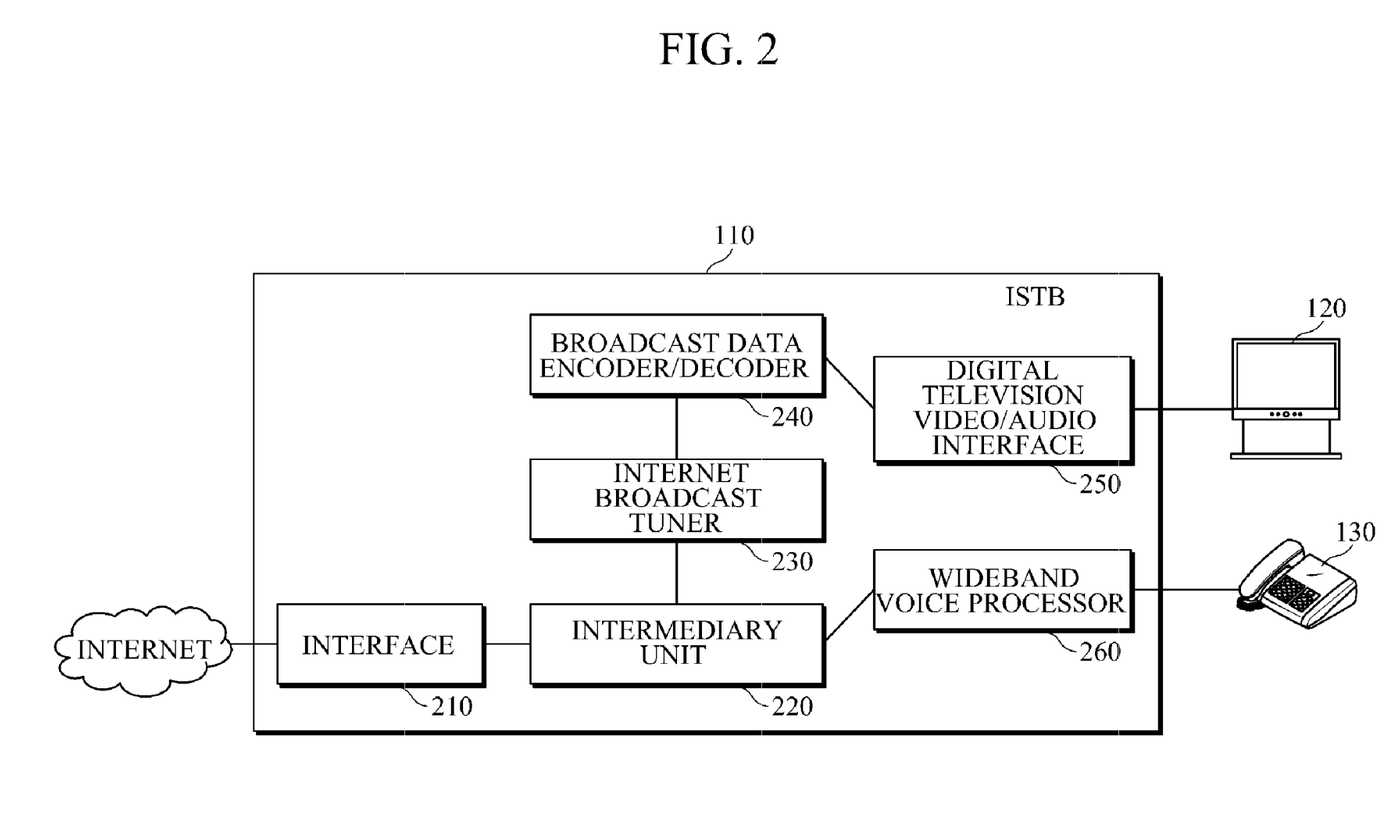
FIG. 2 is a block diagram illustrating an example of an ISTB according to an exemplary embodiment of the present invention.

FIG. 2 is a block diagram illustrating an example of an ISTB 110 according to an exemplary embodiment of the present invention.

Referring to FIG. 2, the ISTB 110 may include an interface 210, an intermediary unit 220, an Internet broadcast tuner 230, a broadcast data encoder/decoder 240, a digital television video/audio interface 250, and a wideband voice processor 260.

The interface 210 transmits or receives IP packets including Internet broadcast streams and Session Initiation Protocol (SIP) call processing packets and voice data associated with IP telephony services.

The intermediary unit 220 transmits transport layer packets related to broadcast streams to the Internet broadcast tuner 230 and transmits transport layer packets including SIP packets and voice data related to an IP phone to the wideband voice processor 260.

The intermediary unit 220 further transmits transport layer packets including SIP packets and voice data from the wideband voice processor 260 to the interface 210.

The Internet broadcast tuner 230 extracts broadcast streams from IP packets.

The broadcast data encoder/decoder 240 converts the broadcast streams extracted by the Internet broadcast tuner 230 into video and audio information which may be displayed by a digital television.

The digital television video/audio interface 250 transmits the video and audio information to the Internet digital television 120.

The wideband voice processor 260 uses a wideband voice codec to implement a wideband speech service.

Figure 3:
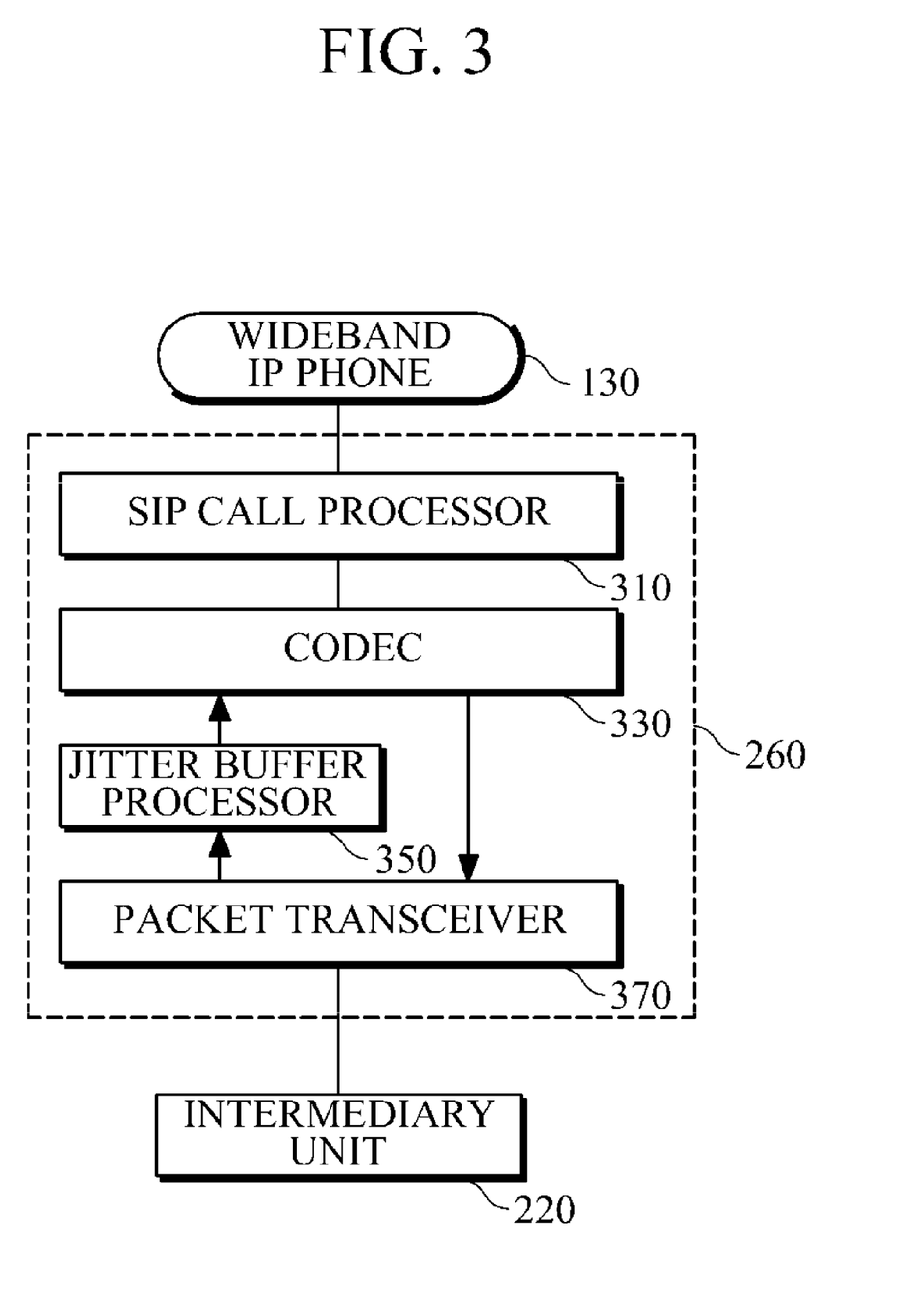
FIG. 3 is a block diagram illustrating a wideband voice processor in FIG. 2.

FIG. 3 is a block diagram illustrating the wideband voice processor 260 in FIG. 2.

Referring to FIG. 3, the wideband voice processor 260 may include an SIP call processor 310, a codec 330, a jitter buffer processor 350, and a packet transceiver 370.

The packet transceiver 370 determines whether a voice codec frame included in an IP phone signal received from the intermediary unit 220 is a narrowband codec frame or a wideband codec frame and generates a different IP phone signal accordingly.

The jitter buffer processor 350 controls the size of a jitter buffer and stores the voice codec frame received from the packet transceiver 370 in the jitter buffer or deletes a stored voice codec frame.

The codec 330 decodes the voice codec frame stored in the jitter buffer into a voice signal or encodes the voice signal into a voice codec frame.

The SIP call processor 310 sets up and tears down voice calls through the SIP.

Figure 4:
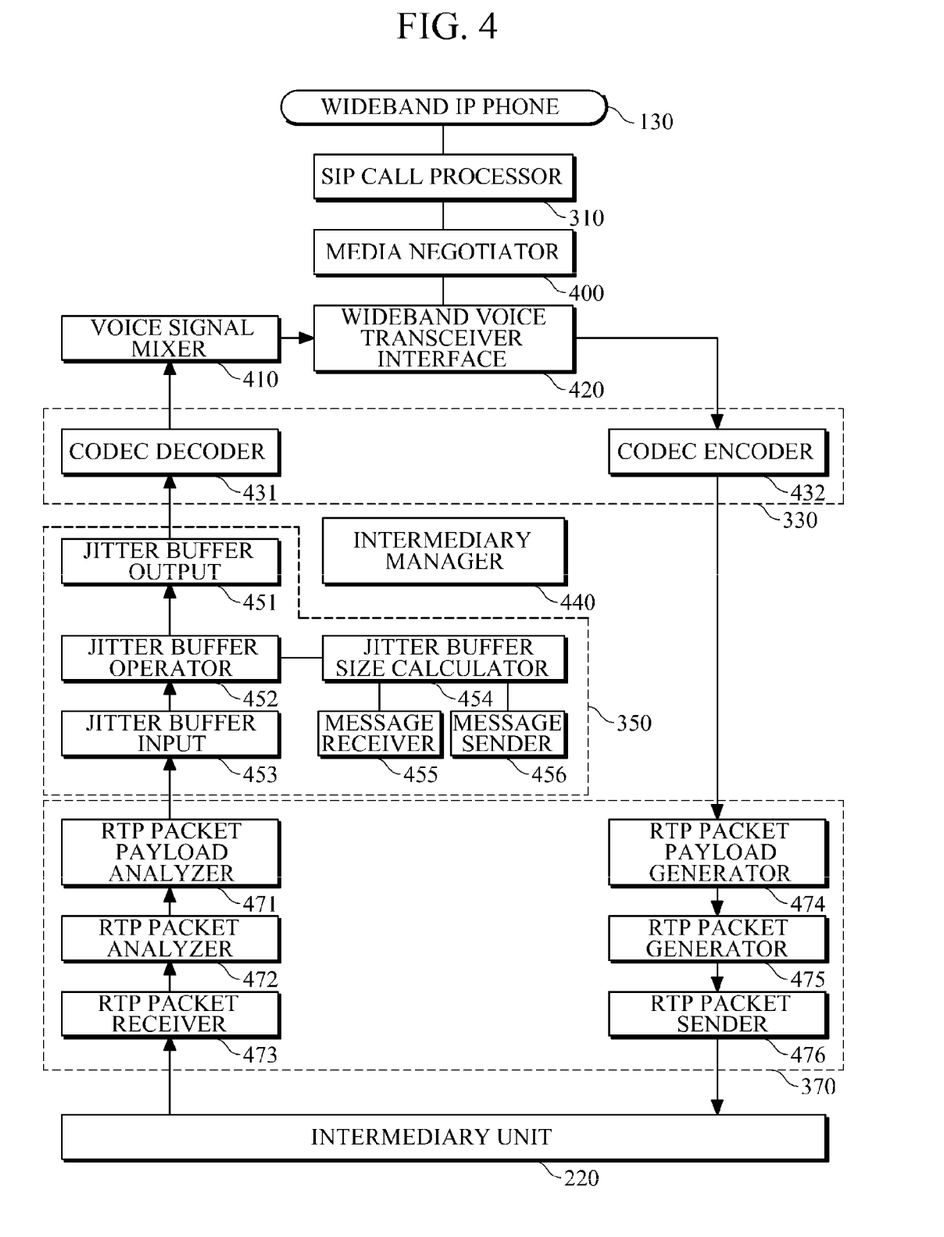
FIG. 4 is a block diagram illustrating a wideband voice processor in FIG. 3.

FIG. 4 is a block diagram illustrating the wideband voice processor 260 in FIG. 3.

Referring to FIG. 4, the wideband voice processor 260 may include an SIP call processor 310, a media negotiator 400, a voice signal mixer 410, a wideband voice transceiver interface 420, a codec decoder 431, a codec encoder 432, an intermediary manager 440, a jitter buffer output 451, a jitter buffer operator 452, a jitter buffer input 453, a jitter buffer size calculator 454, a message receiver 455, a message sender 456, an RTP packet payload analyzer 471, an RTP packet analyzer 472, an RTP packet receiver 473, an RTP packet payload generator 474, an RTP packet generator 475 and an RTP packet sender 476.

The SIP call processor 310 performs call setup/tear-down. The media negotiator 400 performs media negotiation, such as narrowband codec negotiation, wideband codec negotiation, IP address, and UDP port number negotiation.

The voice signal mixer 410 mixes decoded voice signals transmitted from the codec decoder 431 in a conference call service. The codec decoder 431 decodes a narrowband or wideband voice codec frame output from the jitter buffer output 451 into a voice signal.

The jitter buffer output 451 outputs a voice codec frame from the jitter buffer operator 452 to the codec decoder 431 at regular intervals. The jitter buffer operator 452 stores or deletes narrowband or wideband voice codec frames in or from the jitter buffer and controls the size of the jitter buffer.

The jitter buffer input 453 generates a data structure using the type, characteristic information and frame of a narrowband or wideband voice codec to store the narrowband or wideband voice codec frame transmitted from the RTP packet payload analyzer 471 in the jitter buffer, and transmits the data structure to the jitter buffer operator 452.

If a voice codec frame is a wideband codec frame, a payload header is added to an RTP packet payload. If a voice codec frame is a narrowband codec frame, a payload header is not added to an RTP packet payload. The RTP packet payload analyzer 471 extracts a codec frame considering a payload header, and processes a wideband codec frame if there is a payload header.

The RTP packet analyzer 472 analyzes an RTP packet header and transmits the type of an RTP packet payload to the RTP packet payload analyzer 471.

The RTP packet receiver 473 extracts an RTP packet from a User Datagram Protocol (UDP) packet.

The jitter buffer size calculator 454 calculates a jitter buffer size using traffic delay information and the number of voice codec frames inserted into or deleted from the jitter buffer.

Further, in the case of making a conference call through an ISTB equipped with a wideband IP phone function, the jitter buffer size calculator 454 collects a jitter buffer size of a wideband voice processor of the ISTB participating in the conference call and applies it to calculation of the jitter buffer size for synchronization of voice calls of the ISTB.

The message receiver 455 receives a message about a jitter buffer size of a wideband voice processor of another ISTB participating in a conference call and transmits the jitter buffer size to the jitter buffer size calculator 454.

The message sender 456 transmits a message about a jitter buffer size of an ISTB corresponding to the message sender 456 to a wideband voice processor of another ISTB participating in a conference call.

The intermediary manager 440 manages RTP stream intermediary information, narrowband-wideband codec information and jitter buffer information of a wideband voice processor corresponding to the media negotiator 400 and another wideband voice processor which is remotely located.

The codec encoder 432 encodes a voice signal transmitted from the wideband voice transceiver interface 420 into a narrowband or wideband voice codec frame and transmits the narrowband or wideband voice codec frame to the RTP packet payload generator 474.

In the case of a wideband codec frame, the RTP packet payload generator 474 adds a payload header to an RTP packet payload and adds a voice codec frame thereto. In the case of a narrowband codec frame, the RTP packet payload generator 474 adds a voice codec frame to an RTP packet payload without adding a payload header to the RTP packet payload. The RTP packet payload generator 474 then transmits the RTP packet payload to the RTP packet generator 475.

The RTP packet generator 475 generates an RTP packet header using the narrowband or wideband voice codec information, and generates an RTP packet using the RTP packet payload and the RTP packet header transmitted from the RTP packet payload generator 474.

The RTP packet sender 476 adds the RTP packet to a UDP packet and transmits it to a wideband IP phone of another ISTB which is connected thereto.

Figure 5:
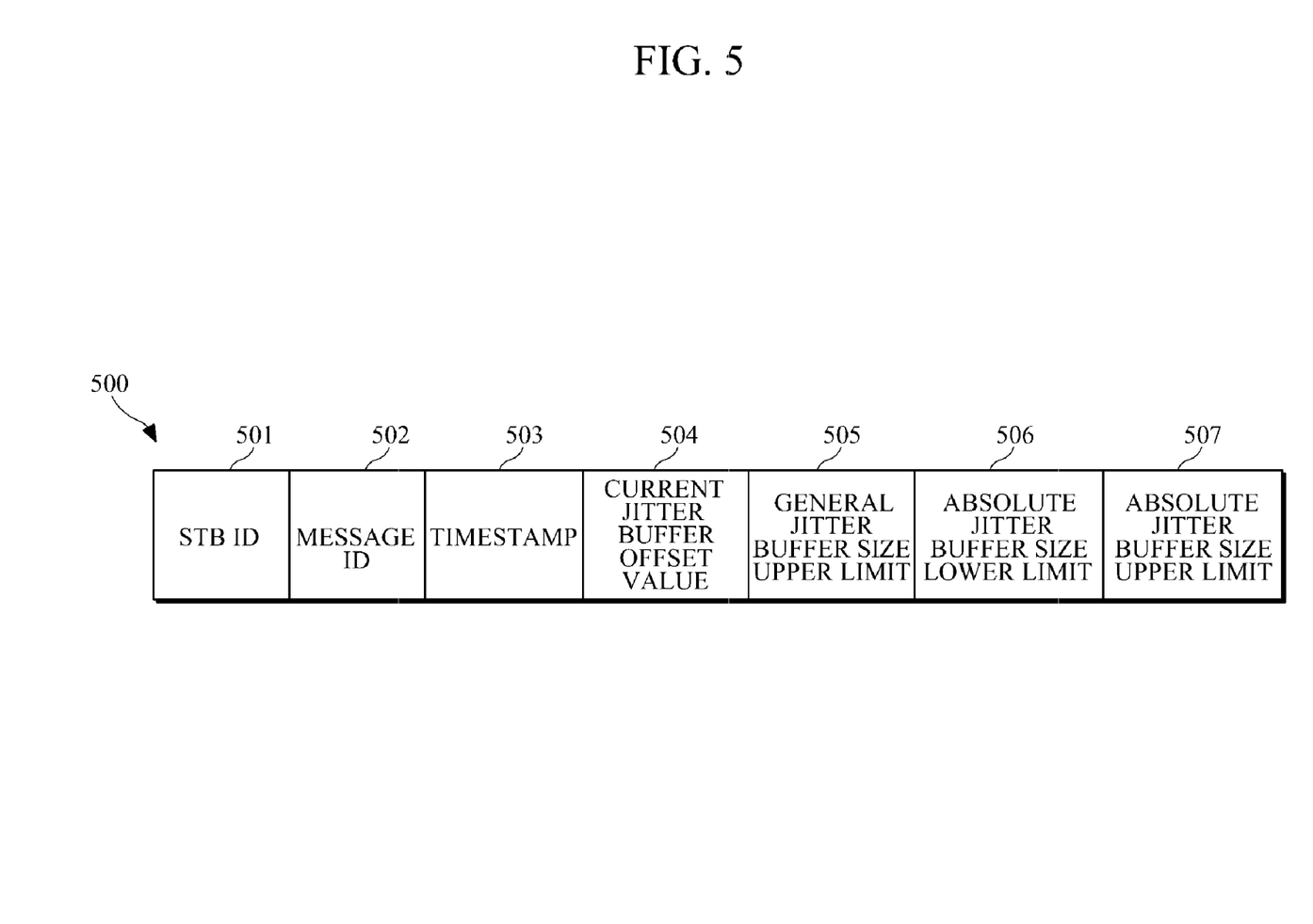
FIG. 5 illustrates an example of a jitter buffer sync message which is used in a message receiver and a message sender in FIG. 4.

FIG. 5 illustrates an example of a jitter buffer sync message 500 which is used in the message receiver 455 and the message sender 456 in FIG. 4.

Referring to FIG. 5, the jitter buffer sync message 500 includes an STB ID field 501 for identifying a set-top box (STB), a message ID field 502 for identifying a duplicate message, a timestamp field 503 for estimating the time when the jitter buffer sync message is generated, a current jitter buffer offset value field 504 for indicating an offset value of a current jitter buffer, a general jitter buffer size upper limit field 505 for indicating a general upper limit of a jitter buffer size, an absolute jitter buffer size lower limit field 506 for indicating an absolute lower limit of a jitter buffer size, and an absolute jitter buffer size upper limit field 507 for indicating an absolute upper limit of a jitter buffer size.

Figure 6:
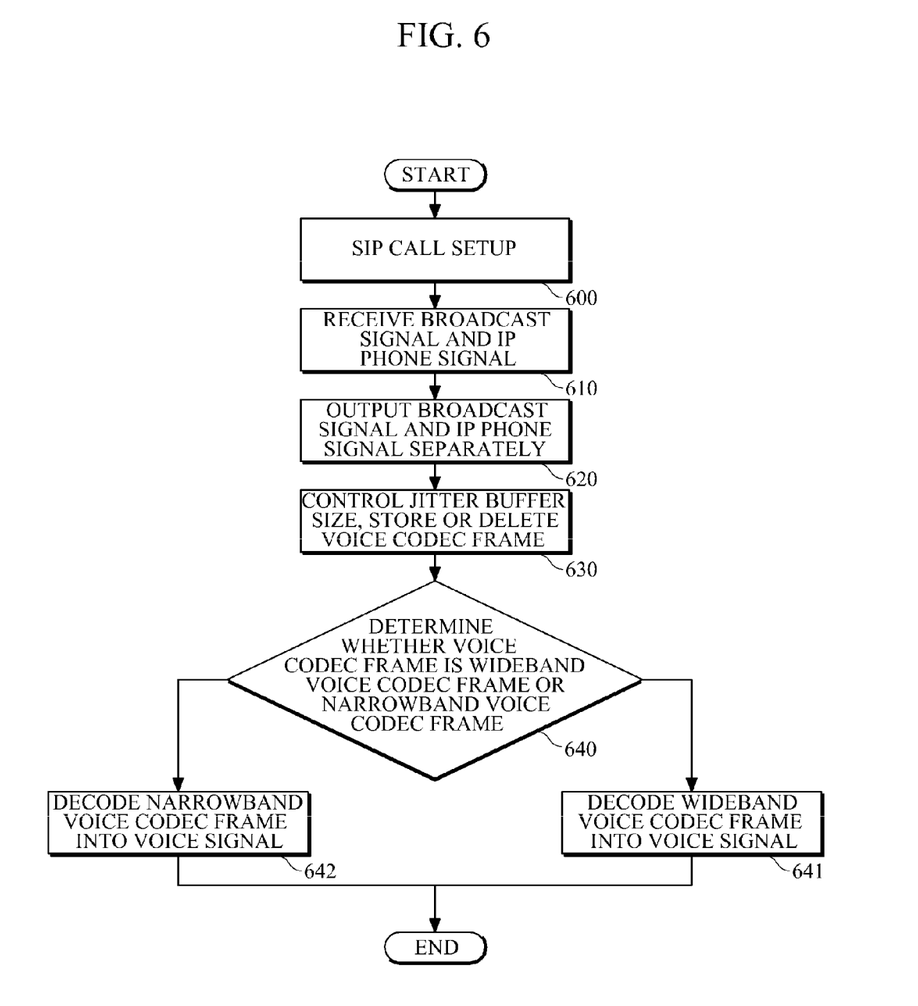
FIG. 6 is a flowchart illustrating an example method of receiving an IP phone signal according to an exemplary embodiment of the present invention.

FIG. 6 is a flowchart illustrating an example method of receiving an IP phone signal according to an exemplary embodiment of the present invention.

In operation 600, an SIP call is set up so that a user may perform voice communication with another user.

In operation 610, a broadcast signal and an IP phone signal are received. In operation 620, the broadcast signal and the IP phone signal are separately output.

In operation 630, a voice codec frame is extracted from the IP phone signal, the extracted voice codec frame is stored in a jitter buffer or, if necessary, a voice codec frame stored in the jitter buffer is deleted after adjusting the size of the jitter buffer.

In operation 640, it is determined whether a voice codec frame output from the jitter buffer is a wideband voice codec frame or a narrowband voice codec frame.

In operation 641, the wideband voice codec frame is decoded into a voice signal. In operation 642, the narrowband voice codec frame is decoded into a voice signal.

Figure 7:
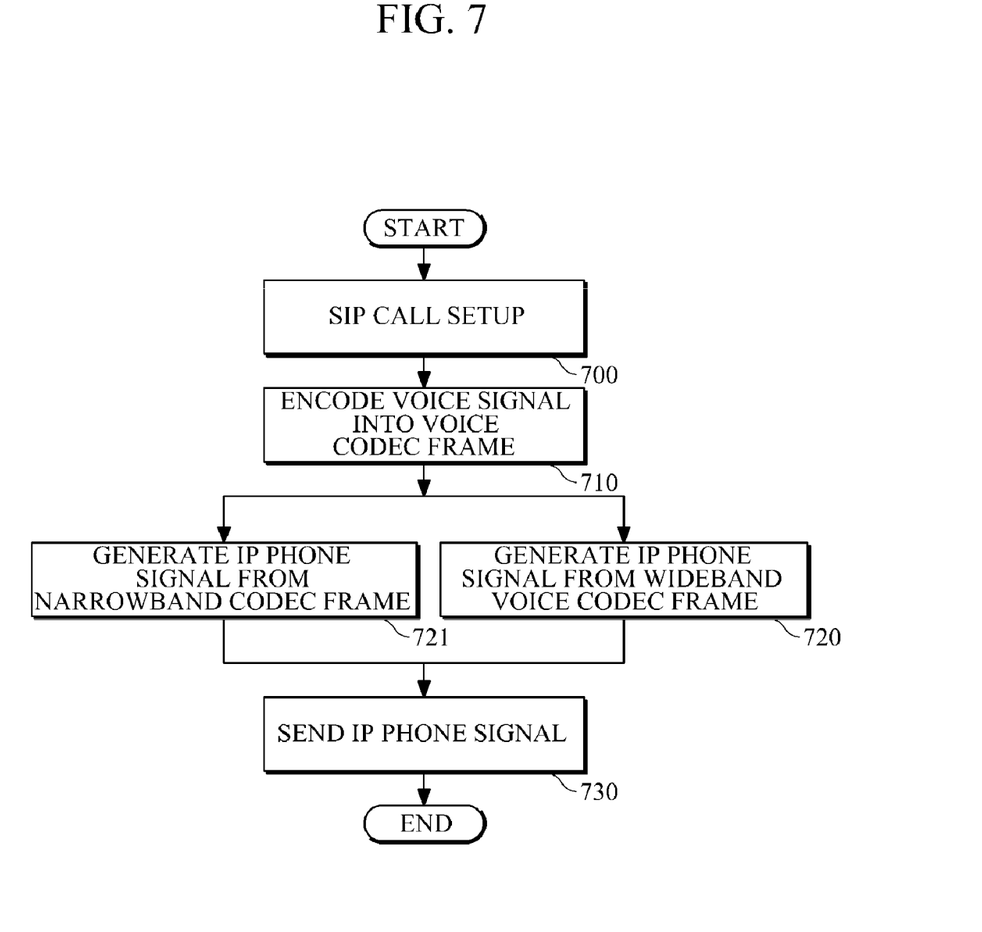
FIG. 7 is a flowchart illustrating an example method of sending an IP phone signal according to an exemplary embodiment of the present invention.

FIG. 7 is a flowchart illustrating an example method of sending an IP phone signal according to an exemplary embodiment of the present invention.

In operation 700, an SIP call is set up at the request of a user. In operation 710, a voice signal of the user is encoded into a voice codec frame.

In operations 720 and 721, a different IP phone signal is generated depending on whether the encoded voice codec frame is a wideband codec frame or a narrowband codec frame. This process has been described above with reference to the packet transceiver 370 in FIG. 4.

In operation 730, the IP phone signal is transmitted to the other user's ISTB.

The current embodiments can be implemented as computer readable code in a computer readable recording medium. Code and code segments constituting the computer program can be easily inferred by a skilled computer programmer in the art. The computer readable recording medium includes all types of recording median in which computer readable data are stored. Examples of the computer readable recording medium include a ROM, a RAM, a CD-ROM, a magnetic tape, a floppy disk, and an optical data storage. Further, the recording medium may be implemented in the form of a carrier wave such as Internet transmission. In addition, the computer readable recording medium may be distributed to computer systems over a network, in which computer readable code may be stored and executed in a distributed manner.

As apparent from the above description, the ISTB providing wideband IP telephony services can implement wideband voice communication services using the wideband voice codec and control the RTP packet payload to process a variety of wideband speech frame payloads. Further, the ISTB can provide high-quality wideband IP telephony services by controlling the jitter buffer to maintain conference call synchronization.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A set-top box providing wideband IP telephony services over Internet, comprising:
   an interface transmitting or receiving a broadcast signal or an IP phone signal;
   an intermediary unit separately outputting the broadcast signal and the IP phone signal; and
   a wideband voice processor converting the IP phone signal received from the intermediary unit into a voice signal using a wideband voice codec and converting an input voice signal into an IP phone signal using the wideband voice codec,
   wherein the wideband voice processor comprises a jitter buffer processor controlling a size of a jitter buffer and storing a voice codec frame received from a packet transceiver therein or deleting a stored voice codec frame therefrom.

2. The set-top box of claim 1, wherein the wideband voice processor comprises:
   the packet transceiver discriminately outputting the voice codec frame included in the IP phone signal received from the intermediary unit as a narrowband codec frame or a wideband codec frame, and generating a different IP phone signal according to whether the voice codec frame is a narrowband codec frame or a wideband codec frame;
   a codec decoding the voice codec frame stored in the jitter buffer into a voice signal or encoding the voice signal into a voice codec frame; and
   a session initiation protocol (SIP) call processor setting up and tearing down voice calls through the SIP.

3. The set-top box of claim 2, wherein the packet transceiver comprises:
   a real-time transport protocol (RTP) packet receiver extracting an RTP packet from an IP phone signal received in a user datagram protocol (UDP) packet format;
   an RTP packet analyzer analyzing a header of the RTP packet to check type of an RTP packet payload included in the RTP packet; and
   an RTP packet payload analyzer extracting a voice codec frame according to the RTP packet payload type and, if a header of the RTP packet payload is present, outputting the voice codec frame as a wideband codec frame.

4. The set-top box of claim 2, wherein the packet transceiver comprises:
   an RTP packet payload generator generating an RTP packet payload including the voice codec frame, which is encoded by the codec, with a payload header added thereto if the voice codec frame is a wideband codec frame;
   an RTP packet generator generating an RTP packet with a packet header added thereto, the packet header indicating type of the RTP packet payload using codec information of the voice codec frame; and
   an RTP packet transmitter converting the RTP packet into an IP phone signal of a UDP packet format and transmitting the converted RTP packet.

5. The set-top box of claim 2, wherein the jitter buffer processor comprises:
   a jitter buffer input receiving the voice codec frame and type and characteristic information of a voice codec for the voice codec frame from the packet transceiver;
   a jitter buffer operator controlling a size of the jitter buffer using the type and characteristic information of the voice codec by storing the voice codec frame in the jitter buffer or deleting a stored voice codec frame from the jitter buffer; and
   a jitter buffer output outputting the voice codec frame stored in the jitter buffer at regular intervals.

6. The set-top box of claim 5, wherein the jitter buffer processor comprises:
   a message receiver receiving a message including information about a size of a jitter buffer of another set-top box which is connected to the set-top box to participate in an Internet call;
   a message sender sending a message including information about a size of a jitter buffer of the set-top box to the other set-top box; and
   a jitter buffer size calculator calculating the size of the jitter buffer using traffic delay information of the Internet, number of voice codec frames stored in and deleted from the jitter buffer, and information about the jitter buffer size of the other set-top box included in the received message.

7. The set-top box of claim 6, wherein the message comprises:
   a set-top box ID for identifying a set-top box;
   a message ID for identifying a message;
   a timestamp for estimating when a message is generated; and
   a size of a jitter buffer.

8. The set-top box of claim 2, further comprising:
   a media negotiator setting IP address, UDP address and codec information of the set-top box; and
   an intermediary manager managing resource information set by the media negotiator, and RTP packet intermediary information, codec information and information about a jitter buffer size of another set-top box which is connected to the set-top box to participate in an Internet call.

9. The set-top box of claim 2, further comprising a voice signal mixer mixing voice signals decoded by the codec.

10. A method of providing wideband IP telephony services through a set-top box providing broadcast services over Internet, the method comprising:
   performing call setup or tear-down through Session Initiation Protocol (SIP);
   receiving a broadcast signal or an IP phone signal;
   outputting the broadcast signal and the Internet signal separately;
   storing a voice codec frame included in the IP phone signal in a jitter buffer, controlling a size of the jitter buffer, and storing the voice codec frame or deleting a stored voice codec frame;

discriminately outputting the voice codec frame included in the IP phone signal as a narrowband codec frame or a wideband codec frame; and decoding the voice codec frame stored in the jitter buffer into a voice signal.

11. A method of providing wideband IP telephony services through a set-top box providing broadcast services over Internet, comprising:

performing call setup or tear-down through Session Initiation Protocol (SIP);

encoding an input voice signal into a voice codec frame;

generating a different IP phone signal according to whether the voice codec frame is a narrowband codec frame or a wideband codec frame; and transmitting the IP phone signal.

* * * * *